Jan. 15, 1935. J. M. M. GREGORY 1,988,038
TUBE CLOSURE
Filed Sept. 16, 1933

John M. M. Gregory
Inventor

By C. A. Snow & Co.
Attorneys.

Patented Jan. 15, 1935

1,988,038

UNITED STATES PATENT OFFICE 1,988,038

TUBE CLOSURE

John M. M. Gregory, Durham, N. C.

Application September 16, 1933, Serial No. 689,752

3 Claims. (Cl. 221—60)

The device forming the subject matter of this application is a tube of the kind in which tooth paste and similar substances are contained. The invention aims to provide a novel means whereby a ribbon of tooth paste may be laid on the brush. Another object of the invention is to provide novel means whereby a free flow of tooth paste or the like may be had upon occasion. A further object of the invention is to supply novel means for closing securely the opening through which the tooth paste passes, it being possible to uncover the opening readily, when a supply of tooth paste is desired.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
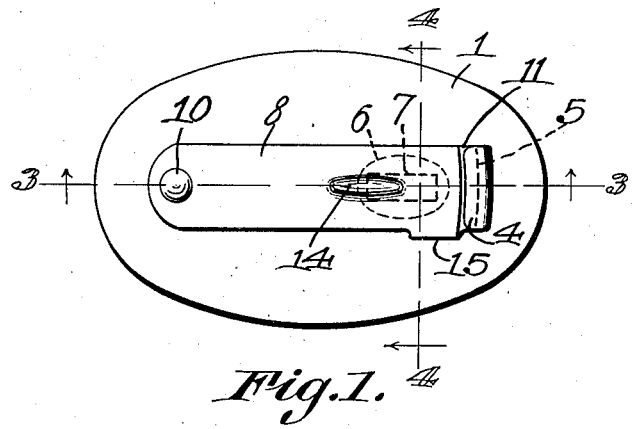
Fig. 1 shows in top plan, a device constructed in accordance with the invention.
Figure 2:
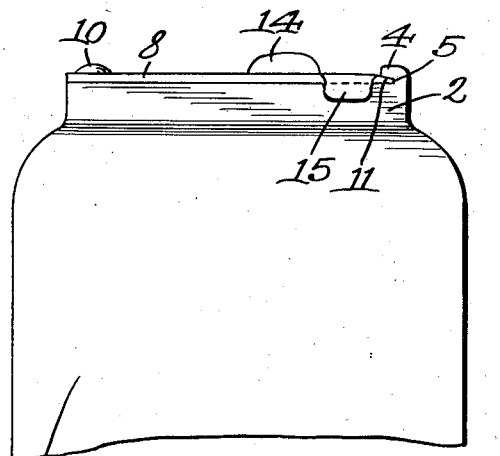
Fig. 2 is a side elevation.

The device forming the subject matter of this application comprises a flexible tube or body 1, preferably made of metal, as is common in the art, the lower end of the tube being closed. At its upper end, the body 1 is supplied with a thickened head 2. On the head 2, an integral rivet 3 is formed. On that end of the head 2 which is remote from the rivet 3 there is an overhanging lug 4, provided on its inner side with an outwardly tapered seat 5. Adjacent to the member 4, the head 2 is supplied with an outwardly tapered opening 6. The opening terminates, at the upper surface of the head 2, in a mouth 7, which, preferably although not necessarily, is of elongated rectangular form, as indicated in dotted line in Fig. 1 of the drawing.

Figure 3:
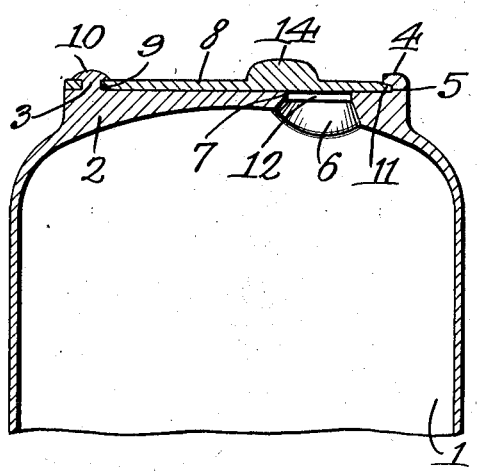
Fig. 3 is a section on the line 3—3 of Fig. 1.
Figure 4:
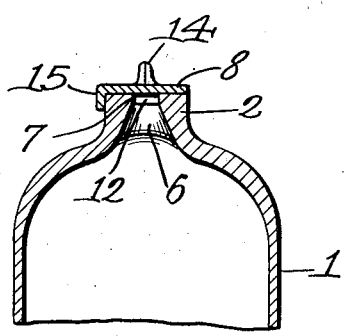
Fig. 4 is a section on the line 4—4 of Fig. 1.

The numeral 8 designates a wing or plate, which may be made of resilient metal, or any other suitable substance. The area of the wing or plate 8 is about the same as the area of the top of the head 2. At one end, the wing 8 has an opening 9, through which the rivet 3 on the head 2 passes, the end of the rivet 3 being formed into a button 10, engaging the wing 8. The wing 8, thus, is pivotally mounted on the head 2 for lateral swinging movement in a direction at right angles to the axis of the tube or body 1. That end of the wing plate 8 which is remote from the rivet 3 is thinned, as shown at 11, to fit closely but detachably in the seat 5 of the lug 4 on the head 2. On its lower surface, the plate 8 carries an integral closure plug 12 which is rectangular in shape, and is adapted to fit in the mouth 7 of the outlet opening 6 in the head 2. The wing 8 is equipped with an upstanding finger piece 14, whereby the wing may be manipulated conveniently. It is to be observed that, as shown in Fig. 3, the finger piece 14 overlaps the closure plug 12. Thus, the wing 8 is strengthened, adjacent to the closure plug 12, and the plug will never be distorted in the operation of the device. The closure plug 12, therefore, keeps its shape and always fits tightly but detachably in the mouth 7 of the opening 6. On one side of the wing 8 there is a depending stop 15, adapted to engage one side of the head 2.

In practical operation, the wing 8, being resilient, can be sprung enough to detach the closure plug 12 from the mouth 7 of the outlet opening 6 in the body 1, and, by means of the finger piece 14, the wing 8 can be swung laterally on the rivet or pivot element 3, the thinned end 11 of the wing 8 passing out from beneath the lug 4. The tube 1 thus is opened, so that the contents of the tube can be squeezed out through the opening 6 and its mouth 7. By a reversal of the operation above described, the parts are returned to the positions shown in the drawing, the stop 15 engaging the side of the head 2. The general construction of the device is such that the wing 8 is securely held in place when no tooth paste is desired. The article, however, can be opened readily to permit the delivery of the tooth paste.

Having thus described the invention, what is claimed is:

1. In a device of the class described, a tube having a head provided with an outlet, and a resilient wing pivoted to the head for lateral swinging movement, the wing having a closure plug received in the outlet, the head being provided on its upper surface with an overhanging lug wherein one extreme end of the wing is releasably received and housed.

2. In a device of the class described, a tube having a head provided with an outlet, and a wing pivoted to the head for lateral swinging movement, the wing having a closure plug received in the outlet, the head being provided with a lug wherewith one end of the wing is releasably engaged, the wing being supplied with a depending stop, engaging one side of the head, when the plug is in the outlet.

3. In a device of the class described, a tube having a head provided with an outlet, and a wing pivoted to the head for lateral swinging movement, the wing having a closure plug received in the outlet, the wing being supplied with an upstanding finger piece which overlaps the plug, to reenforce the wing adjacent to the plug and to keep the wing in such a shape that the plug will fit in the outlet.

JOHN M. M. GREGORY.